United States Patent [19]

Burmeister et al.

[11] 4,302,275

[45] Nov. 24, 1981

[54] APPARATUS FOR FORMING TUBULAR PLASTIC SLEEVES FOR APPLICATION TO BOTTLES

[75] Inventors: Robert J. Burmeister, Toledo; Russell W. Heckman, Perrysburg; Robert C. Miller, Whitehouse; George A. Nickey, Toledo, all of Ohio

[73] Assignee: Owens-Illinois, Inc., Toledo, Ohio

[21] Appl. No.: 97,762

[22] Filed: Nov. 27, 1979

[51] Int. Cl.³ ............................................. B65C 3/12
[52] U.S. Cl. ................................. 156/446; 156/218; 156/450; 156/456; 156/457; 156/458; 493/306; 493/472; 493/475

[58] Field of Search ............... 156/446, 457, 458, 456, 156/203, 218, 583.3, 450, 86; 93/81 R, 81 MT; 53/585, 567

[56] References Cited

U.S. PATENT DOCUMENTS

| | | | |
|---|---|---|---|
| 1,074,680 | 10/1913 | Witham | 93/81 R |
| 1,439,606 | 12/1922 | Coates | 93/81 R |
| 2,343,331 | 3/1944 | Scusa | 93/81 R |
| 2,390,550 | 12/1945 | Moore | 156/583.3 X |
| 3,729,359 | 4/1973 | Monsees | 156/466 |
| 3,914,152 | 10/1975 | Amberg | 156/446 |
| 4,008,649 | 2/1977 | Shikaya | 93/81 MT X |
| 4,208,857 | 6/1980 | Fujio | 156/86 X |

*Primary Examiner*—David A. Simmons
*Attorney, Agent, or Firm*—E. J. Holler; M. E. Click; D. H. Wilson

[57] ABSTRACT

The present invention relates to improved apparatus for forming a tubular plastic sleeve immediately prior to its application to a rigid base article, such as a glass or plastic bottle. A rectangular blank of plastic material is wrapped around a cylindrical mandrel and seamed lengthwise thereon to form the tubular sleeve. The mandrel has a plurality of spline-shaped grooves in its curved peripheral surface and a stripper ring mounted to closely surround such peripheral surface to be slidable thereon. The ring has a plurality of internal lugs which slidably fit within the spline-shaped grooves. The mandrel has a lineal array of vacuum ports for retaining the leading and trailing edges of the plastic blank on the mandrel for its wrapping thereon, and an axial resilient strip mounted in the curved peripheral surface of the mandrel for operation of a movable, axially-extending sealing bar thereagainst. A wedge-shaped expansion member is also mounted in a wedge-shaped channel or groove in the mandrel peripheral surface between a pair of spline-shaped grooves. The expansion member is adapted to be moved vertically with respect to the mandrel for contraction of the mandrel diameter to release the newly-formed sleeve for its removal therefrom. The sleeve is then applied to a glass or plastic bottle for heat shrinking thereon in a thermoconstrictive operation. The apparatus is especially adapted to forming a wide range of thicknesses of a variety of heat-shrinkable thermoplastic materials into suitable tubular sleeves for telescopic mounting on such containers in a rapid, efficient manner.

16 Claims, 11 Drawing Figures

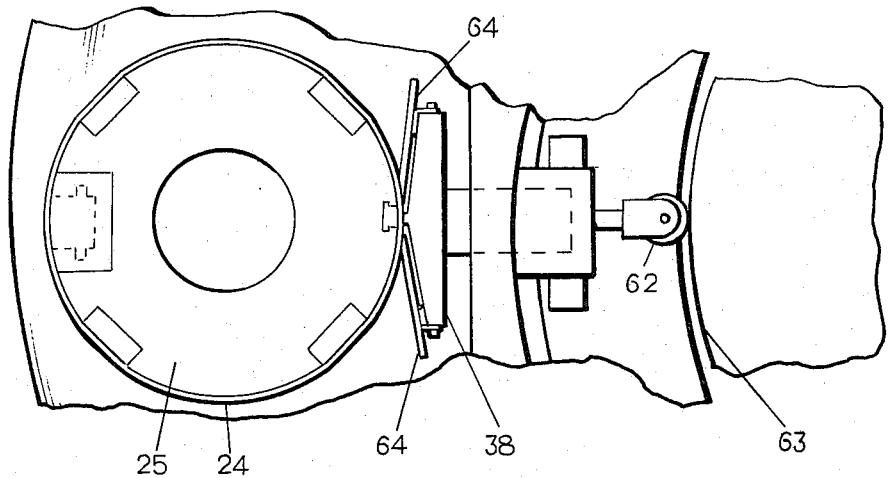
FIG. 6
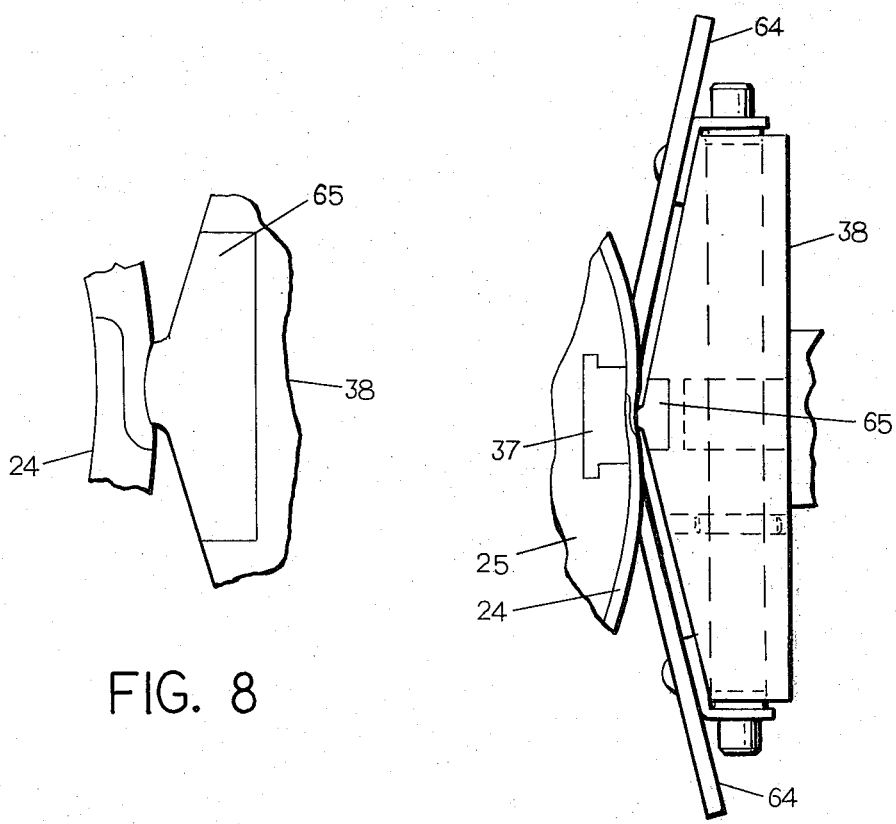
FIG. 8
FIG. 7

APPARATUS FOR FORMING TUBULAR PLASTIC SLEEVES FOR APPLICATION TO BOTTLES

BACKGROUND OF THE INVENTION

1. Field of the Invention

This invention relates in general to a machine for making a thin plastic covering in the form of a tubular presized sleeve for application to a rigid base article.

2. Description of the Prior Art

The prior art discloses two basic machines for forming and applying a thin plastic covering or tubular sleeve to a rigid base article such that a subsequent heat-shrinking process results in a tightly constrictive plastic covering. U.S. Pat. No. 3,110,554 to Yazumi discloses an apparatus for labeling packages. A thin rectangular thermoplastic blank is formed into an open-ended tubular sleeve using a heat-sealing bar to form a lengthwise fusion seam. The diameter of the tubular sleeve is made only slightly larger than the diameter of the article to be covered. The sleeve is then placed directly on the body portion of the rigid article and a thermal operation contracts the heat-shrinkable plastic sleeve to make it conform tightly to the body portion surfaces of the article therebeneath.

U.S. Pat. No. 3,802,942 to Amberg et al, assigned to the same common assignee as the present application, discloses another type of sleeve-making apparatus. The thin plastic covering is supplied in the form of a large roll or web which is serially cut into uniform-size rectangular blanks. The plastic blanks are introduced to a plastic sleeve forming mechanism. The leading edge of the plastic blank is retained on a cylindrical mandrel by the pressure differential created by a vacuum applied through a series of vacuum ports formed in the mandrel and external atmospheric pressure. The mandrel is then rotated to wrap the plastic blank around the curved external surface of the mandrel. When a complete rotation is effected to overlap ends to form an open-ended tubular plastic sleeve. A preheated rigid base article such as a cylindrical container is positioned above the mandrel so that their longitudinal axes are coincidental. A stripper ring, also longitudinally aligned but positioned below the mandrel, is moved upwardly until it engages the plastic sleeve on the mandrel and pushes it telescopically upwardly onto the rigid base article or container. The heat retained in the article causes the plastic sleeve to shrink slightly such that it remains in position on the article after the stripper ring is lowered. The article with its plastic sleeve temporarily mounted thereon is then subjected to a final heat-shrinking process such as in a tunnel oven where the heat-shrinkable sleeve is contracted to tightly conform to the underlying article surface.

SUMMARY OF THE INVENTION

The present invention relates to improved apparatus for forming and applying a thin thermoplastic sleeve or covering, such as a foamed polystyrene or film polyvinyl chloride, to a rigid base article such as glass or plastic bottles. The present invention involves improved apparatus which avoids prior problems encountered in the forming and applying of thin plastic sleeves or coverings, chiefly wrinkling or binding in the transfer from the forming means to an aligned rigid base article, by employing a distinctively-contoured cylindrical forming mandrel and a stripper ring slidable thereon. Such apparatus is adapted to both improved forming a wider range of covering materials, as well as effecting their transfer, after formation into a presized open-ended tubular sleeve, in a uniform and trouble-free manner onto the rigid article.

The thermoplastic material is severed into proper rectangular lengths and wrapped around the exterior of a generally cylindrical mandrel. The mandrel has an axially-extending expansion member mounted within its curved exterior surface adapted to form the sleeve with a prescribed diameter slightly greater than the article on which it is to be mounted. The expansion member is adapted to be contracted on the mandrel to facilitate release and ready removal of the newly-formed sleeve, and its transfer to the rigid article. The plastic blank is sealed at its overlapped edges to form a tubular sleeve, the edges being located over a resilient strip member mounted in the mandrel exterior surface. A distinctively-shaped sealing bar is employed to contact the edges over the resilient strip member to form a fusion seam or seal thereat. A series of vacuum ports is located adjacent the strip member to retain the blank edges during the wrapping and sealing operations.

The mandrel has a spaced-apart series of spline-shaped grooves in its curved peripheral surface extending in an axial direction. An annular stripper ring is mounted on the mandrel in closely fitting arrangement having a series of internal lug members adapted to fit slidably within the spline-shaped grooves. The lugs assist use of the ring in stripping the sleeve from the mandrel and telescoping same over the aligned rigid article, especially in the case of thin film plastic material. The lugs serve to attain uniform non-binding stripping of the sleeve from the mandrel and onto the article where it is heat-shrunken in place.

It is, therefore, an object of this invention to provide apparatus for the improved forming and applying of a thin plastic sleeve to a rigid base article.

Another object of this invention is to increase the efficiency and reduce the cost of cylindrical containers having a plastic sleeve label-like covering thereon.

A further object of this invention is to provide apparatus adapted to operate compatibly with existing machines designed to produce plastic covered articles such as containers.

Further objects are readily attainable as set forth more fully hereinafter, and as illustrated in the accompanying drawings.

BRIEF DESCRIPTION OF THE DRAWINGS

FIG. 6 is an enlarged fragmentary plan view of a mandrel member and the heat sealing bar operable therewith.

FIG. 7 is a further enlarged fragmentary view of the sealing bar, heat shield, plastic sleeve and mandrel shown in FIG. 6.

FIG. 8 is a still further enlarged fragmentary view of the sealing bar and plastic sleeve shown in FIGS. 6 and 7.

DETAILED DESCRIPTION OF THE INVENTION

The present invention is an improvement in an apparatus for forming and applying a tubular plastic sleeve to a rigid base article such as a glass or plastic bottle. The component parts and subassemblies of the basic machine can be operated and controlled by any suitable means. U.S. Pat. No. 3,802,942 discloses a machine for producing plastic covered glass containers, and such disclosure is incorporated herein by reference. Therefore, a detailed description of all of the machine components and their prescribed operation will not be presented here. Such a machine, including the present invention, is shown schematically in plan view in FIG. 1.

Figure 1:
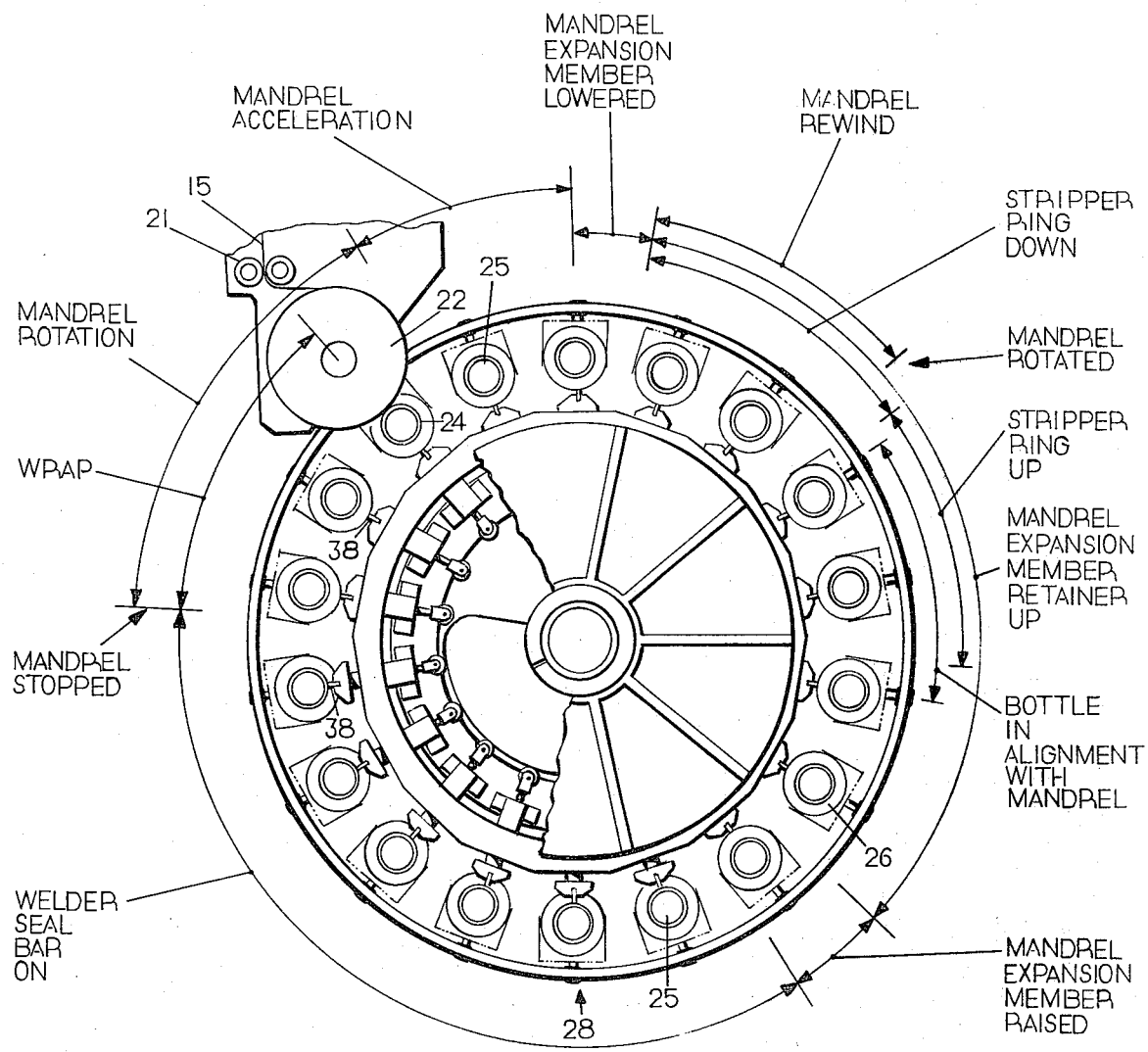
FIG. 1 is a plan view of apparatus and cycle timing for forming and applying a tubular plastic sleeve to a cylindrical bottle in accordance with the present invention.

FIG. 1 illustrates the plastic sleeve forming station of the machine wherein a web 15 of preformed thin thermoplastic material is delivered from a roll between a pair of feed rolls 21 onto a rotating feed drum 22. A plurality of small ports in the feed drum 22 are connected to a vacuum source to create a pressure differential with the external atmosphere to retain the plastic web 15 on the feed drum. A rotating cutting blade (not shown) severs the web 15 into uniform blanks 24 of desired length. Each plastic blank 24 is wound on an individual rotating mandrel 25 with its leading edge being retained by an axial series of vacuum ports located in its curved peripheral surface. The mandrels 25 are mounted in equiangular relation in series around a rotary turret 28. Each blank is seamed into a fusion seal at an end-to-end overlap region to form the tubular plastic sleeve 26. The spaced-apart series of vertical mandrels 25 on the turret 28 move in synchronism with the bottles 27 carried on a suitable separate conveyor in similar spaced-apart arrangement. The individual bottles are carried through a coincident path in vertical alignment with one of the turret mandrels. The tubular plastic sleeve 26 is stripped upwardly from the mandrel 25 and telescoped over the bottle 27 in aligned closely-fitting relation. The retained heat in the preheated bottles serves to shrink the sleeve to maintain it temporarily in position on the bottle during the subsequent heat-shrinking operation.

Figure 2:
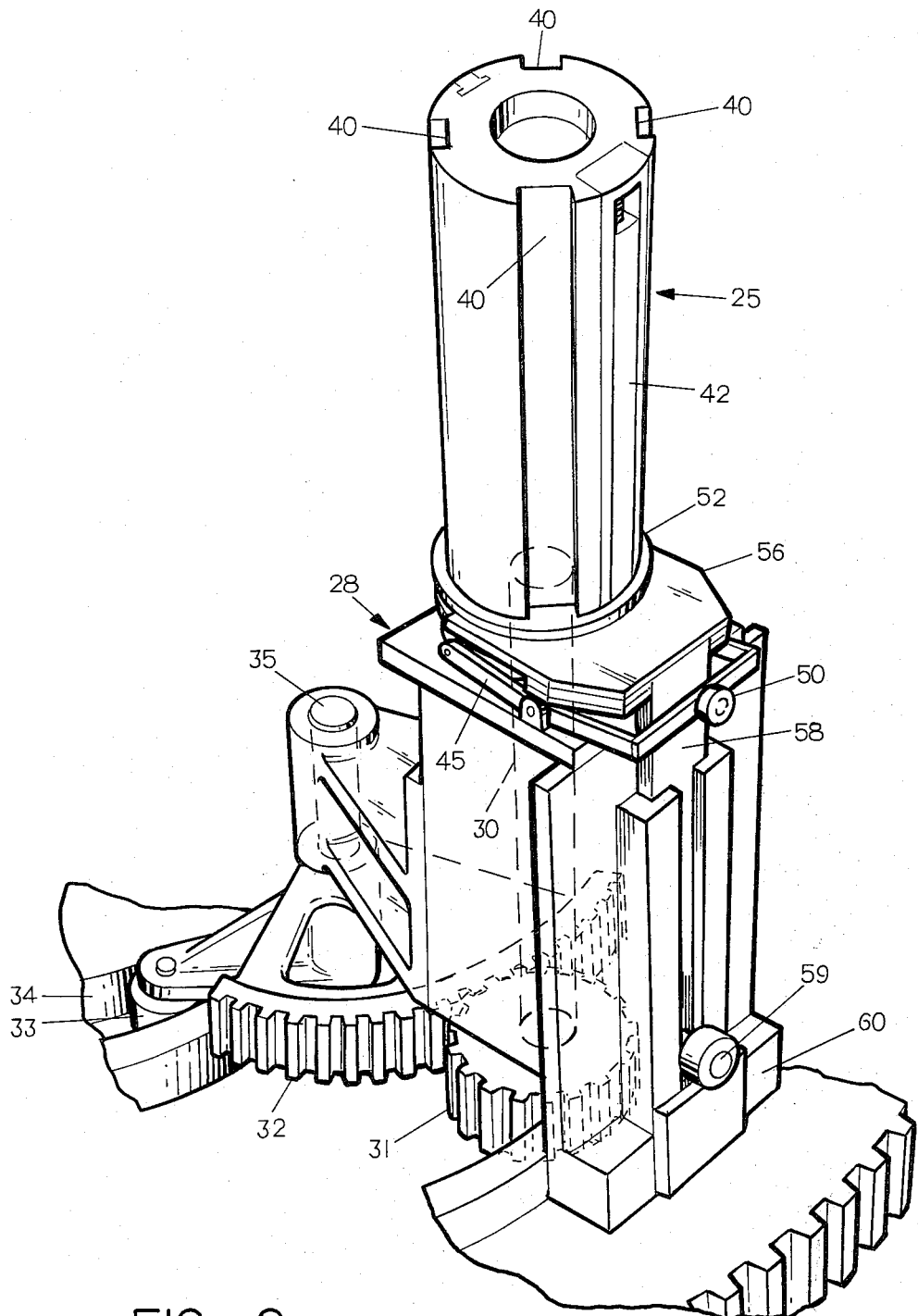
FIG. 2 is a perspective view of an individual mandrel member and associated components of the apparatus of FIG. 1.

The present invention relates to an improvement in the apparatus of the turret at the sleeve forming and applying stations of the machine. FIG. 2 illustrates the mandrel 25 mounted on a vertical shaft 30 which rotates the mandrel about its longitudinal axis. The mandrel is driven in axial rotation by shaft 30 during its travel primarily around the upper left-hand quadrant of turret travel as shown in FIGS. 1 and 2. Shaft 30 has a gear 31 at its lower extremity which is engaged by a sector gear 32 which is driven by a cam follower 33 mounted in a suitable cam track 34. Sector gear 32 is mounted on a pivot pin 35 around which it is turned for mandrel acceleration, rotation and rewind.

Figure 5:
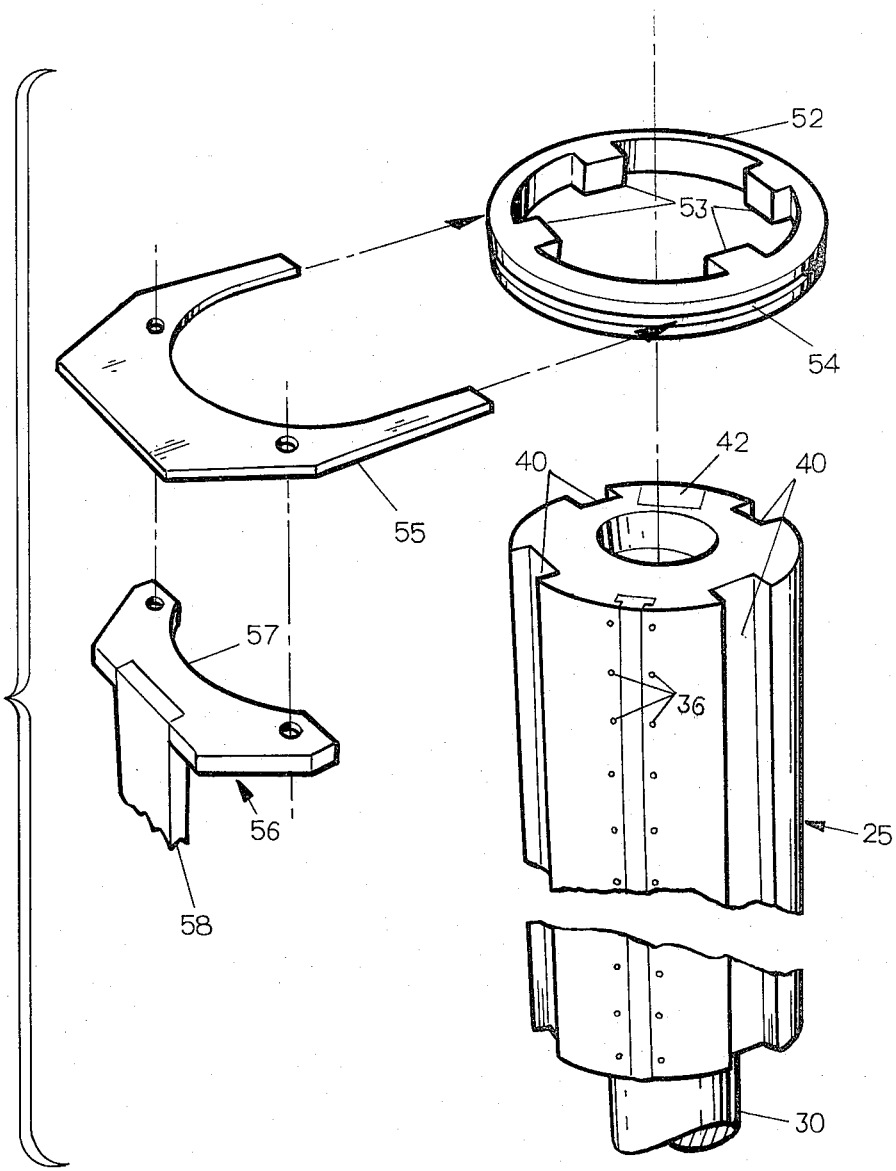
FIG. 5 is an exploded perspective view of an individual mandrel member and associated components.

A plurality of vertically aligned vacuum ports 36 is formed in lineal array in the curved peripheral surface of the mandrel 25, as shown in FIG. 5. Each vacuum port is connected to a central vacuum passage in the mandrel, which in turn is connected to a vacuum manifold on the machine turret. Although two rows of vacuum ports are preferred to firmly retain the two ends of the blank, more than two rows may also be employed as desired.

A lineal strip 37 of resilient material is mounted in the curved exterior surface of the mandrel generally flush therewith, adjacent and between the two rows of vacuum ports 36. Strip 37 serves as a backing member for an axially-mounted adjacent sealing bar 38 which is capable of sealing the overlapped ends of the blank into a fusion seam. A high-temperature silicone rubber strip having a Durometer Hardness of about 70 is preferred. Sealing bar 38, one of which is individual to each mandrel 25, is adapted to horizontal movement against the resilient strip with the overlapped ends therebetween to heat and pressure-seal the same. This is accomplished quickly whether the sheet thermoplastic material is comprised of foam, film, or a film-foam laminate of similar or dissimilar materials. Normally the material will vary in thickness from about 5 to 20 mils in the case of foam and the foam-film laminate, and from about 1 to 5 mils in the case of film.

Each mandrel 25 has a series of four equi-spaced spline-shaped grooves or recesses 40 formed in its curved peripheral surface. The strip 37 of resilient material is located between one pair of adjacent parallel recesses 40. As stated, the lineal array of vacuum ports 36 is also located closely adjacent the strip 37, one row on each side and parallel thereto.

Each mandrel 25 has an expansion member 42 located in a groove 43 formed in the mandrel peripheral surface. Expansion member 42 has a wedge-shaped surface 42a fitted within a complemental wedge-shaped bottom 43a of the groove 43. The expansion member is normally retained in spring-loaded relation in its lowermost position in the groove 43 by an upper spring 44 so that its exterior surface protrudes slightly beyond the curved surface of the mandrel normally enlarging its diameter.

Figure 3:
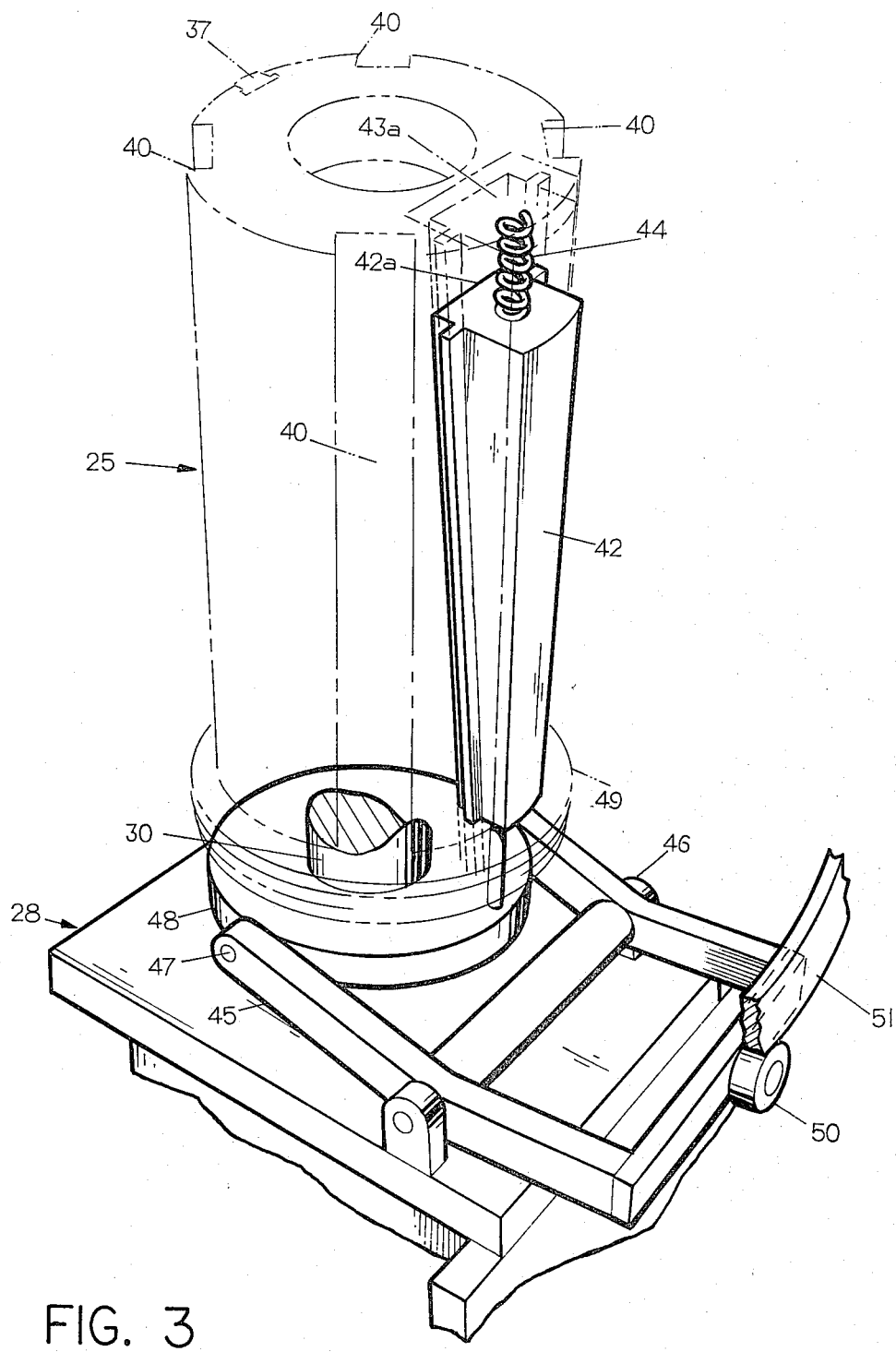
FIG. 3 is a further enlarged perspective view of an individual mandrel member as shown in FIG. 2.
Figure 4:
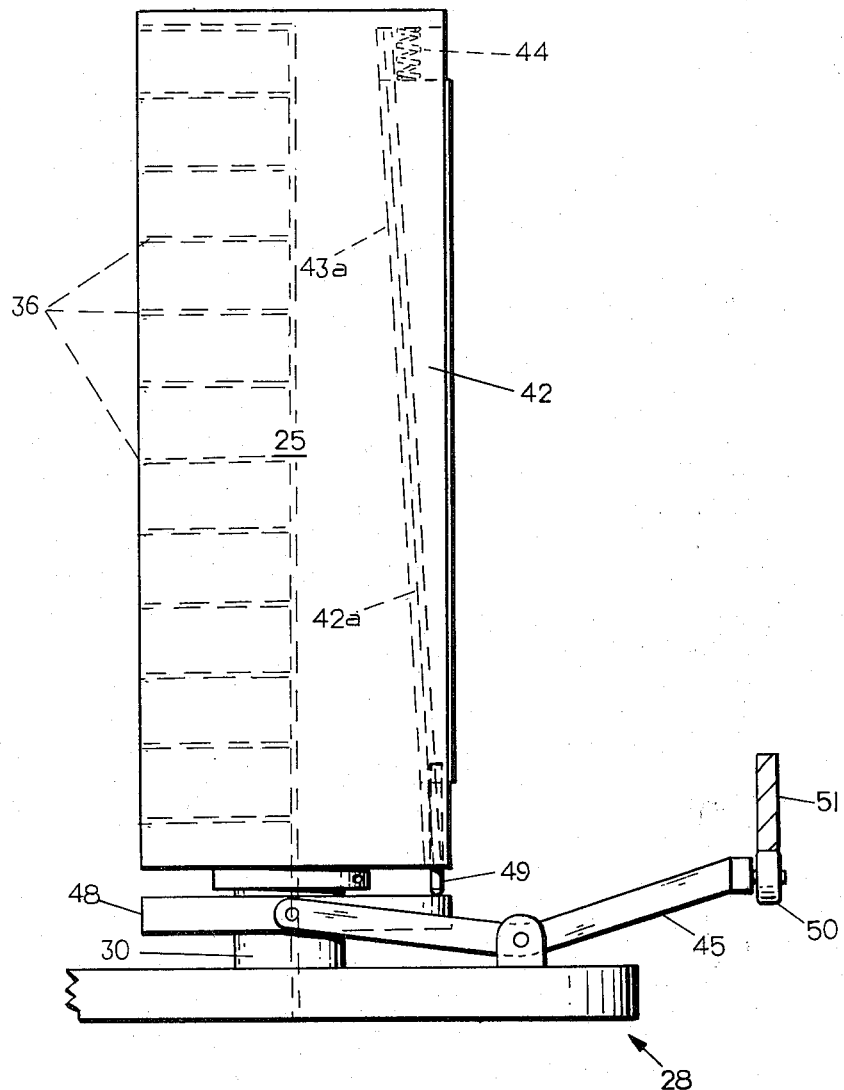
FIG. 4 is a side elevational view of an individual mandrel member as shown in FIGS. 2 and 3.

A lifting arm member 45 is mounted on turret 28 individual to each of the mandrels 25. Lifting arm 45 is bifurcated and mounted pivotally to be moved around a pivot pin 46 as shown in FIG. 3. Lifting arm 45 has a pair of opposing pivot pins 47 which fit within a ring member 48 carried in non-rotatable relation on the turret 28. Ring 48 surrounds rotatable shaft 30 which drives the mandrel. An upwardly-projecting pin member 49 is located on an outer portion of ring 48 adapted to raise and lower expansion member 42 when located in outwardly-facing relation during non-rotation of the mandrel. A cam follower 50 is mounted on an outwardly-facing portion of lifting arm 45 which contacts stationary cam track 51 to raise and lower pin member 49.

Figure 9:
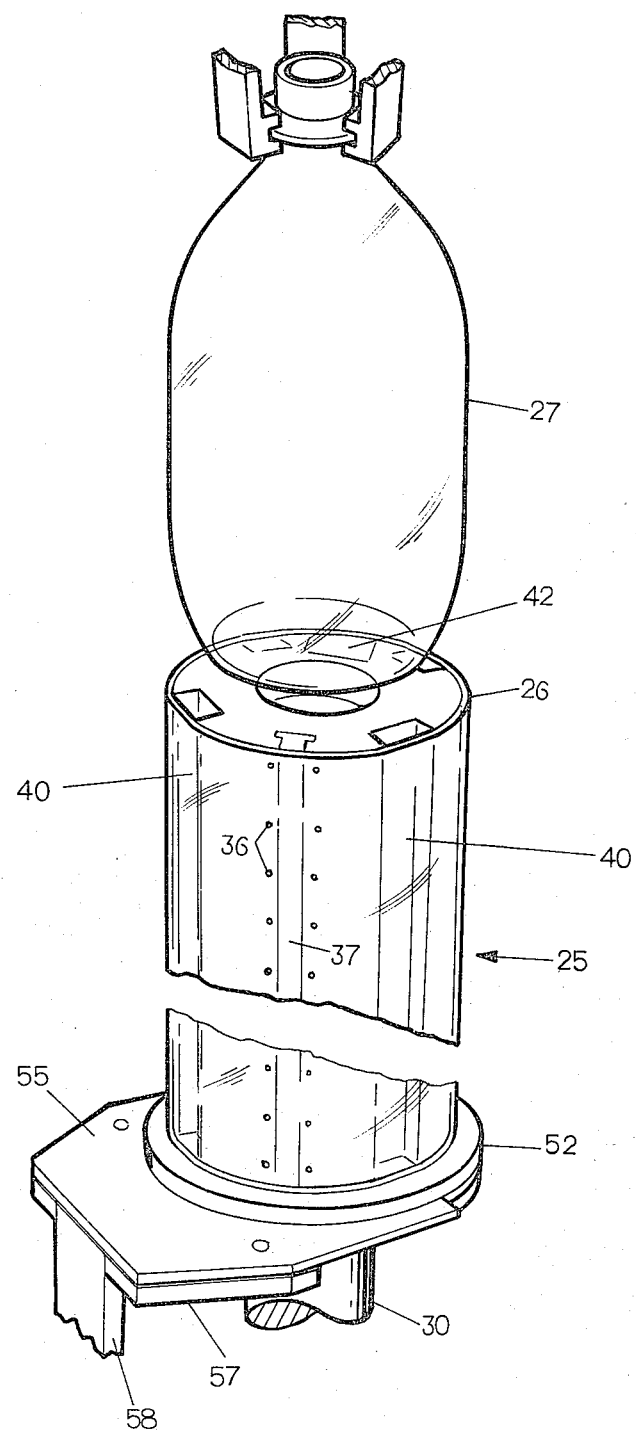
FIG. 9 is a perspective view of a newly-formed transparent plastic sleeve on a forming mandrel prior to its transfer to an axially-aligned bottle.
Figure 10:
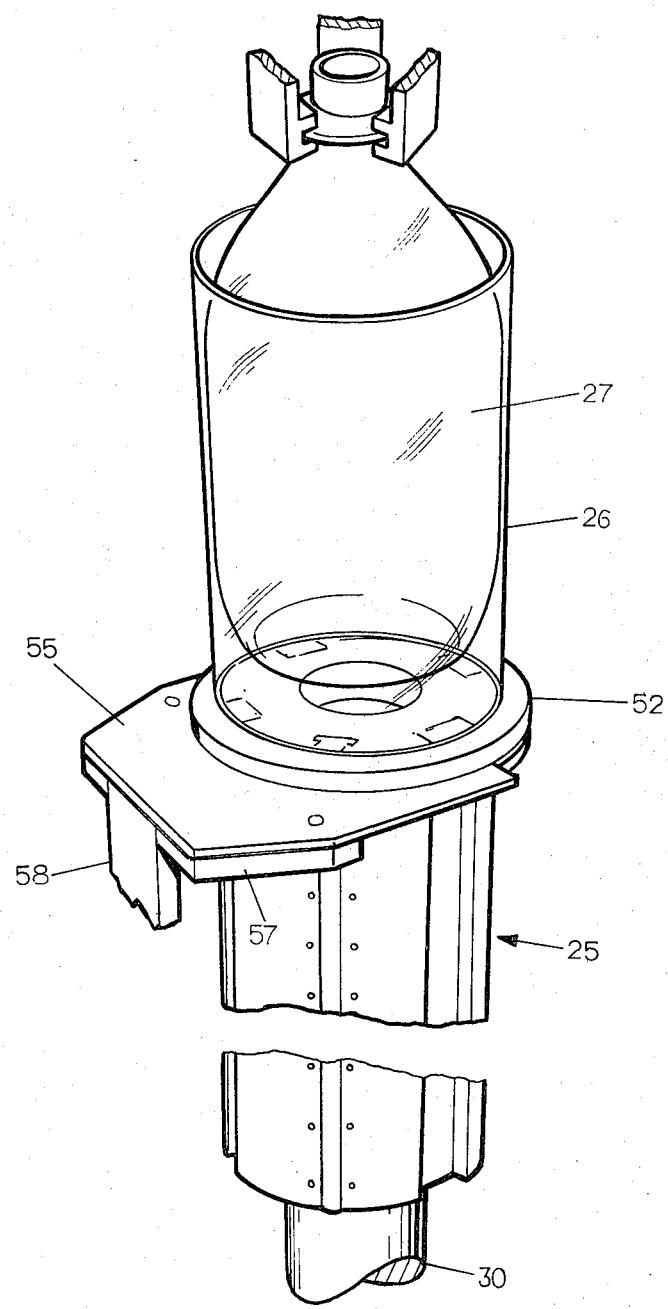
FIG. 10 is a perspective view of the transparent plastic sleeve after being telescoped over the aligned bottle in accordance with the present invention.
Figure 11:
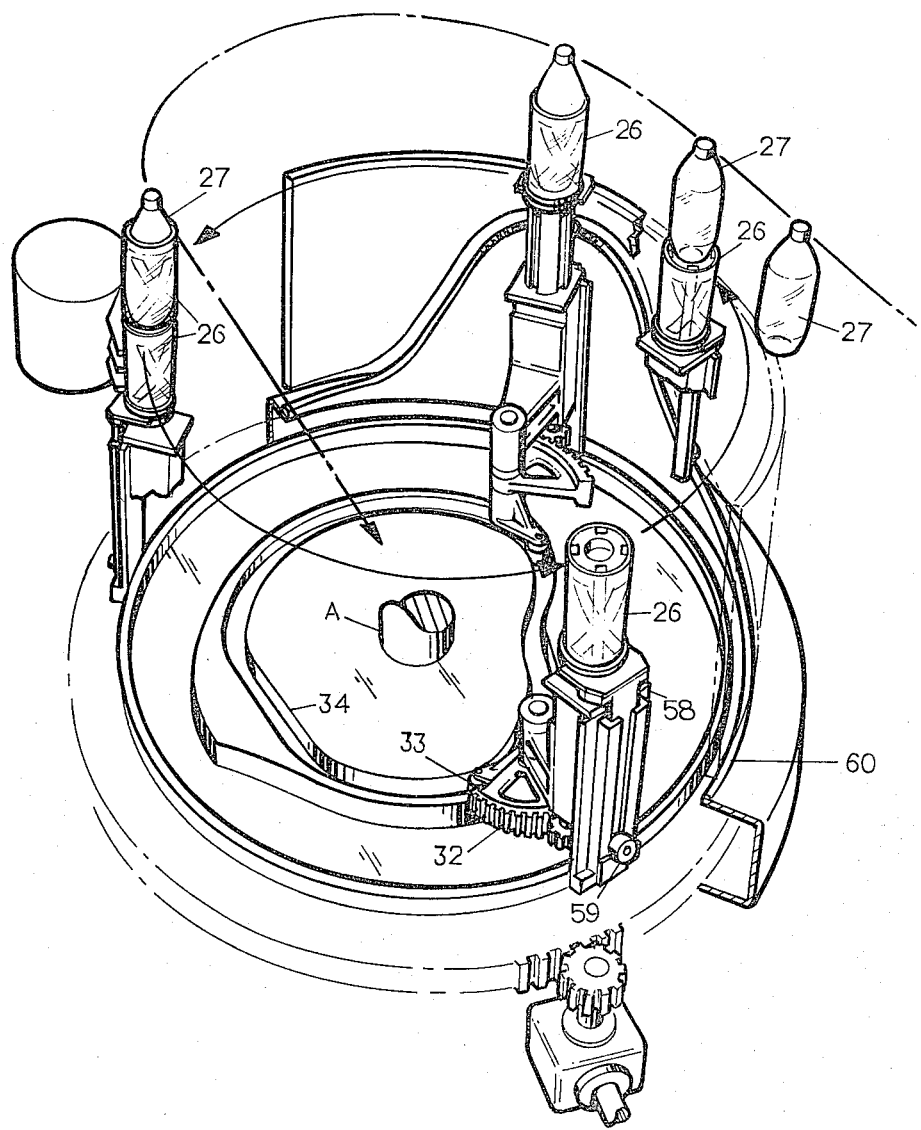
FIG. 11 is a fragmentary perspective view of the mandrel members and associated stripper ring members of the apparatus for telescopically transferring the newly-formed plastic sleeve to the axially-aligned bottle.

A stripper ring 52 is mounted on a lower extremity of the mandrel 25 adapted to be vertically slidable thereon. Stripper ring 52 has a series of internal lug portions 53 which are complemental in size and number to slidably fit within the spaced-apart spline-shaped grooves 40. Ring 52 has an annular groove 54 in its exterior surface within which is fitted the two opposing arms of a lifting plate 55 as shown in FIG. 5. Plate 55 is mounted on the top of a vertical arm member 56 having a complemental upper portion 57 and a lengthy bar-shaped vertical portion 58. Ring 52 is thus able to be rotated with the mandrel 25 while lifting plate 55 is non-rotational with respect to the mandrel. FIGS. 9 and 10 show the relative movement of ring 52 on the mandrel 25 in timed relation to raise the sleeve 26 into telescoping relation with the bottle 27. A cam follower 59 is mounted on a lower portion of arm bar-shaped vertical portion 58 which follows a stationary cam track 60 to raise and lower the stripper ring 52 as shown in FIG. 2.

With regard to the process as practiced by the present invention, as the plastic blank is fed off the feed drum, a leading edge is held on the mandrel 25 by the pressure differential between the external atmospheric pressure and the vacuum at the vacuum ports. At that time, the mandrel is at the beginning of the winding operation and it rotates in a counter-clockwise direction when viewed from the top. The plastic blank 24 is wound around the mandrel so that one row of vacuum ports 36 retains its leading edge and the second row of ports 36 retains its trailing edge. The blank is wrapped about the mandrel 25 in such manner that the trailing edge overlaps the leading edge. Throughout the winding and sealing operations, the vacuum applied to the blank by the vacuum ports 36 is maintained. In addition, to ensure a tight and uniform wrap, the plastic blank on winding is held against the mandrel by a stationary wrap guide (not shown) which is supported stationarily on the base of the machine adjacent the path of the mandrels on the turret 28.

The rotation of the mandrel 25 is designed to advance the blank leading edge to a point opposite the heat-sealing bar 38 where the trailing edge overlaps the leading edge. The vertically-aligned heat-sealing bar 38 is located adjacent each mandrel. When the winding of the blank on the mandrel is completed, the heat sealing bar is moved against the overlapped edges of the blank. The heat and pressure of the heat-sealing bar against the blank edges seals them together with a fusion seam to form an open-ended tubular sleeve. The bar is then retracted in preparation for the next similar operation, such sealing operation is shown in detail in FIGS. 6, 7 and 8. The sealing bar is moved horizontally into contact with the overlying edges by a cam follower 62 which follows a stationary cam track 63 internally of the turret 28. The bar has a thin, narrow edge disposed vertically which is surrounded on both sides by a heat-shield 64 designed to prevent excessive heat radiation to the mandrels. The bar 38 has its thin, narrow edge preferably comprised of a separate insert 65 of heat-conducting metal such as aluminum and is normally electrically heated.

Following the blank winding and sealing operation, the tubular sleeve 26 is then ready to be telescoped onto the bottle 27 which may be either glass or plastic. As shown in FIG. 9, the bottle is moved into position above the mandrel and its surrounding plastic sleeve. The bottle, sleeve and mandrel are synchronized in their movement so that they are axially aligned and travel at essentially zero velocity relative to each other at the time of telescoping. The source of vacuum applied to the mandrel by the vacuum ports 36 is discontinued immediately preceeding the co-axial alignment in preparation for the ejection operation. Blow air may be injected to assist vacuum release and sleeve movement.

The ejection or transfer operation begins when the actuator or lifting arm 45 connected to the ring and pin members 48 and 49 contacting the lower end of the expansion member 42 in one side of the mandrel is moved upwardly. The outwardly-extending end portion has a cam follower 50 which is moved by a suitable cam track 51 stationarily mounted in the area where the arm is to be moved.

When the expansion member is raised, its wedge shape being moved within the wedge-shaped groove, the diameter of the mandrel is decreased thereby releasing the newly-formed sleeve 26 from tight engagement with the mandrel. The sleeve has been performed with a diameter just slightly larger than the bottle diameter on which it is to be mounted. The sleeve is then ready for the ejection or transfer operation to the bottle.

The ejection operation is continued when the actuator arm 58 connected to the stripper ring 52 is actuated. The arm is bifurcated at its projecting ends where connected to the ring 52 having fingers fitting into the annular groove 54 in the ring exterior surface. The ring is thereby free to turn with its mandrel while the actuator arm or lifting plate 55 remains in stationary relation on the turret. The plate 55 is adapted to be moved upwardly by a suitable cam track 60 with the internal lugs of the ring 52 sliding freely within the mandrel grooves 40. At this time, the expansion member is contracted so that the closely-fitting ring 52 is free to move the sleeve 26 upwardly. The lugs 53 serve to contact and move the lower extremity of the sleeve without wrinkling its lower portion whether it is formed of thin film, thicker foam material, or a laminate of the two. The ring 52 is normally raised to a position slightly above the upper extremity of the mandrel. Then any slight misalignment of the sleeve and overhead bottle during their continuous travel will not cause any malfunction of the telescoping operation.

The sleeve is thus telescoped upwardly over the body portion of the bottle. In the case of a glass bottle, the bottle is normally preheated to cause a temporary sticking or adhesion of the plastic sleeve to its exterior in aligned relation. A plastic bottle is not generally preheated but the close-fitting nature of the sleeve will cause it to temporarily adhere to the bottle exterior in aligned relation. The ring 52 is then lowered on the mandrel by its actuator arm. In either case, the combined bottle and sleeve are then conveyed through a tunnel oven having a temperature ranging from about 175° F. wherein the heat-shrinkable plastic sleeve is contracted tightly around the underlying surfaces of the bottle.

The sleeve may either be transparent or opaque and normally serves to both provide an attractive label for the bottle, as well as additional strengthening means. In the case of the glass bottle, the sleeve provides abrasion and impact resistance. In the case of clear plastic bottles, including those having an attached separate base member, the sleeve serves as a label as well as a suitable covering for the several components.

In summary, the present invention relates to an apparatus for forming tubular sleeves of thermoplastic material and applying such sleeves to rigid base articles such as glass and plastic bottles. The apparatus is especially useful in being able to form a wide variety of plastic materials into precisely-shaped sleeves for both applications. The apparatus includes a generally cylindrically-shaped mandrel and a special separate sealing bar for forming a rectangular plastic blank into a tubular sleeve on the mandrel, the mandrel having an expansion member mounted in its exterior surface adapted to expansion and contraction, a resilient strip for sealing the blank thereagainst, and a plurality of grooves in its curved exterior surface adapted to retain a complemental sliding stripper ring for removing the sleeve from the mandrel. The apparatus is especially useful for operation in conjunction with a bottle conveyor for positioning spaced-apart individual bottles adjacent and in alignment with the mandrel adjacent and above the upper end of the tubular plastic sleeve. The stripper ring on the mandrel is then in a position to effect the telescoping transfer of the sleeve from forming mandrel to bottle.

Various modifications may be resorted to within the spirit and scope of the appended claims.

We claim:

1. In a mandrel turret for forming lengths of sheet-like material into tubular sleeves comprising a base, a turret rotatable on said base, plural mandrel mechanisms rotatably mounted at spaced-apart equi-angular positions on said turret for movement in a circular path with the turret, the improvement wherein each mandrel mechanism comprises a mandrel adapted for rotation about its central axis and having a substantially cylindrical peripheral surface, a series of axially-disposed vacuum applying ports in said substantially cylindrical peripheral surface operable to retain the length of sheet-like material thereon, a lineal strip of resilient material mounted axially in said substantially cylindrical peripheral surface, a series of three or more spline-shaped grooves located axially in substantially equi-spaced-apart relation in said substantially cylindrical peripheral surface of said mandrel, an annular stripper ring member closely surrounding said mandrel having a series of substantially equi-spaced-apart internal lug portions equal in number to the number of said spline-shaped grooves and adapted to slidably fit within said spline-shaped grooves in said mandrel for lineal movement thereon, vertical lifting means adapted to move said stripper ring member on said mandrel, and expansion means mounted within the said substantially cylindrical peripheral surface of said mandrel adapted to expand and contact the circumferential dimension of said mandrel, said expansion means comprising an axial groove in said mandrel peripheral surface, an expansion member slidably mounted in said groove, at least one of said groove and expansion member being wedge-shaped whereby the circumferential dimension of said mandrel peripheral surface is expanded and contracted with axial movement of said expansion member along said groove, means biasing said expansion member in one axial direction in said groove, and means operative to move said expansion member in the opposite axial direction.

2. The improvement defined in claim 1, each said mandrel having at least four equi-spaced spline-shaped grooves in said substantially cylindrical peripheral surface with said lineal strip of resilient material mounted intermediate one pair of said grooves, and said stripper ring member having at least four equi-spaced internal lug members adapted to slidably fit within said spline-shaped grooves.

3. The improvement defined in claim 1 wherein said stripper ring member is arranged to rotate with said mandrel and said stripper ring member has at least one annular groove in its exterior surface adapted to retain a pair of vertical lifting fingers to permit full rotation of said ring member with said mandrel.

4. The improvement defined in claim 1, wherein said mandrel has an axial length greater than the length of said sheet-like material, said vertical lifting means adapted to move said stripper ring member on said mandrel through a vertical distance greater than the length of said sheet-like material in tubular sleeve form for transporting same telescopically over a cylindrical container.

5. The improvement defined in claim 1, wherein said tubular sleeve is adapted for slidable removal from said mandrel by the said series of internal lug portions of said stripper ring member contacting the lower edge of said tubular sleeve during its axial movement on and transfer from said mandrel.

6. A mandrel mechanism for use on a rotary turret for forming lengths of sheet-like material into tubular sleeves comprising a mandrel having a substantially cylindrical peripheral surface and having a length greater than the length of said sheet-like material, a plurality of three or more substantially equi-spaced-apart spline-shaped grooves formed in the substantially cylindrical peripheral surface of said mandrel, a lineal strip of resilient material mounted axially substantially level with said substantially cylindrical peripheral surface of said mandrel, a plurality of vacuum applying ports located in lineal alignment on both sides of said resilient lineal strip adapted to retain both ends of an individual length of sheet-like material on said mandrel, an annular stripper ring member having a plurality of substantially equi-spaced-apart inwardly-facing complemental lug portions equal in number to the number of said spline-shaped grooves and adapted to fit within said spline-shaped grooves for slidable engagement with said mandrel, and an axial groove in said mandrel peripheral surface, an expansion member slidably mounted in said groove, at least one of said groove and expansion member being wedge-shaped whereby the circumferential dimension of said mandrel peripheral surface is expanded and contracted with axial movement of said expansion member along said groove, means biasing said expansion member in one axial direction in said groove, and means operative to move said expansion member in the opposite axial direction.

7. A mandrel mechanism in accordance with claim 6, wherein said mandrel has a wedge-shaped, rigid expansion member slidably mounted within a complemental wedge-shaped axial groove in said mandrel peripheral surface intermediate a pair of said spline-shaped grooves, said expansion member adapted to enlarge and contract the circumferential dimension of said mandrel peripheral surface for formation and release of a newly-formed presized tubular sleeve.

8. A mandrel mechanism in accordance with claim 6, wherein said stripper ring member is arranged to rotate with said mandrel and said stripper ring member has at least one annular groove in its exterior surface to receive a pair of juxtaposed lifting fingers to facilitate vertical movement of said ring member with respect to said mandrel for removal of said sleeve therefrom.

9. A mandrel mechanism in accordance with claim 6, wherein said generally cylindrical mandrel and said stripper ring member have closely matching diameters for relative movement of one with respect to the other for removal of a newly-formed sleeve from said mandrel.

10. The mandrel mechanism in accordance with claim 6, including a heat-sealing bar located adjacent to said mandrel and operable into and out of contact with the overlapped ends of sheet-like material located over said resilient lineal strip of said mandrel to effect heat sealing of said overlapped ends to form a presized tubular sleeve.

11. The mandrel mechanism in accordance with claim 7, including a lifting mechanism having a pair of bifurcated lifting fingers adapted to fit within a single annular groove in said stripper ring member for its vertical movement with respect to said mandrel and to permit rotation of said mandrel and ring member as an integral unit.

12. In an apparatus for assemblying tubular, heat-shrinkable, thermoplastic sleeves telescopically onto base articles, said apparatus having a turret and a plurality of spaced-apart mandrels mounted thereon in circular array, means for carrying blanks of sheet-like material serially to each of said mandrels for forming said blanks into tubular sleeves on said mandrels, the improvement therein comprising a mandrel having a substantially cylindrical peripheral surface and having a length greater than the length of said sheet-like blanks, each mandrel having a plurality of three or more substantially equi-spaced-apart spline-shaped lineal grooves formed in its cylindrical peripheral surface, a lineal strip of resilient material mounted within the cylindrical peripheral surface of said mandrel intermediate a pair of said spline-shaped lineal grooves, a plurality of vacuum applying ports located in lineal array on both sides of said resilient lineal strip adapted to retain the ends of an individual sheet-like blank in overlapped relation on said mandrel, a rigid expansion member slidably mounted within a wedge-shaped axial recess in said mandrel peripheral surface intermediate a pair of said spline-shaped grooves, means biasing said expansion member in one axial direction in said recess, means to effect relative axial movement of said expansion member in the opposite axial direction, said expansion member being adapted to enlarge and contract the circumferential dimension of said mandrel peripheral surface for slidable removal of a newly-formed sleeve, and a stripper ring member having a plurality of substantially equi-spaced-apart internal lug portions, equal in number to the number of said spline-shaped grooves, in its inner surface adapted to fit within the complemental spline-shaped recesses for slidable engagement with said mandrel for removal of a newly-formed tubular sleeve.

13. The improvement in accordance with claim 12, wherein said stripper ring member is arranged to rotate with said mandrel and said stripper ring member has at least one annular groove in its exterior surface to facilitate its vertical movement on said mandrel by retention of a pair of bifurcated lifting fingers.

14. The improvement in accordance with claim 12, wherein said generally cylindrical mandrel and said stripper ring member have closely matching diameters of not more than about 0.010 inch deviation for slidable relative movement of one with respect to the other for removal of a newly-formed thin sleeve therefrom.

15. The improvement in accordance with claim 12, wherein said rigid expansion member is able to effect enlargement in the circumferential dimension of said mandrel of at least about 0.120 inch between its expanded and retracted positions.

16. The improvement in accordance with claim 12, including a heat-sealing bar member having a narrow width complemental to the blank overlapped ends and a length complemental to said mandrel length, a heat-shield disposed intermediate said heat-sealing bar and said mandrel except for the portion of its narrow width, said bar adapted to contact the overlapped ends of the sheet-like blank residing over said resilient lineal strip to form the presized tubular sleeve, and electrical means adapted to heat said heat-sealing bar member.

* * * * *